(12) United States Patent
Haslip et al.

(10) Patent No.: US 7,317,191 B1
(45) Date of Patent: Jan. 8, 2008

(54) STANDOFF RADIATION IMAGING DETECTOR

(75) Inventors: Dean S. Haslip, Ottawa (CA); Thomas Cousins, Dunrobin (CA); Vernon Koslowsky, Deep River (CA); Harry Ing, Deep River (CA); Hugh R. Andrews, Pembroke (CA); Edward T. H. Clifford, Deep River (CA); Darren Locklin, Petawawa (CA)

(73) Assignee: Her Majesty the Queen in right of Canada, as represented by the Minister of National Defence of Her Majesty's Canadian Government (CA)

( * ) Notice: Subject to any disclaimer, the term of this patent is extended or adjusted under 35 U.S.C. 154(b) by 0 days.

(21) Appl. No.: 11/595,928

(22) Filed: Nov. 13, 2006

(51) Int. Cl.
*G01J 1/42* (2006.01)

(52) U.S. Cl. .................................................. 250/372

(58) Field of Classification Search ............. 250/358.1, 250/372, 461.1
See application file for complete search history.

(56) References Cited

U.S. PATENT DOCUMENTS 6,448,562 B1 * 9/2002 Seidler et al. .............. 250/372

* cited by examiner

*Primary Examiner*—David Porta
*Assistant Examiner*—Mark R Gaworecki
(74) *Attorney, Agent, or Firm*—George A. Seaby

(57) ABSTRACT

A sensor for detecting the radio-luminescence created by radioactive sources includes a telescope, a plurality of UV sensitive cameras, and an optical system in the optical path of the telescope for directing images to the cameras. The cameras simultaneously obtain images from a plurality of spectral bands covering strong transitions of N2 molecule created by the radioactive source and at least one spectral band containing very little transition strength (a background band). The background image is used to assess the background level for the other spectral bands. The images are then fused digitally to create one image of the radio-luminescence.

19 Claims, 3 Drawing Sheets

STANDOFF RADIATION IMAGING DETECTOR

FIELD OF THE INVENTION

This invention relates to a remote sensor for radioactive material.

More specifically, the invention relates to a sensor that obtains images of an area from selected UV bands associated with air luminescence generated by any radioactive material in that area.

BACKGROUND OF THE INVENTION

The proliferation of nuclear weapons and the possible detonation of a radiological dispersal device (a dirty bomb), the deliberate damaging of a radioisotope production facility and many other terrorist scenarios have generated a requirement for detecting nuclear materials from a distance. Nuclear materials are difficult to detect with most presently available detectors such as gamma ray detectors, because such detectors must be close to a nuclear source, i.e. within the radiation field generated by a radioactive source in order for detection to occur.

Nuclear materials generate ionizing radiation in the surrounding atmosphere, which creates air luminescence that can be imaged from a distance. Air luminescence is a result of de-excitation of excited molecular nitrogen and nitrogen molecular ions ($N_2^+$) created by the ionizing process. The wavelength of the luminescence lies primarily in several ultraviolet bands between 280 and 425 nm and has unique spectral fingerprints consisting primarily of $N_2$ second positive group emissions.

U.S. Pat. No. 6,448,562, issued to William A. Seidler et al mentions this principle in order to provide a remote sensor for detecting a nuclear source by obtaining an image of the source from photons generated by ionizing radiation in ultraviolet spectral regions. The patent teaches the use of an optical system for remotely detecting selected wavelengths of photon emissions from an airglow caused by a source of ionizing radiation by filtering sufficient out-of-band wavelengths while transmitting enough in-band wavelengths to allow detection of nuclear material with the selected wavelengths. The invention may be used to remotely detect $N_2^+$ line emissions or other ultraviolet (UV) line emissions having defined naturally occurring properties. The camera used in the invention responds to photons resulting from "airglow" caused by gamma rays emitted from a nuclear material source which hit atmospheric $N_2$ and result in $N_2^+$ ions. The $N_2^+$ ions then emit photons at wavelengths of, for example 391.4 nm and 358.4 nm, as they return to a groundstate. The patent teaches that the nitrogen molecule in an excited state emits ultraviolet photons with a wavelength of 391.4 nm. (and others, for example 337.1 nm, 357.7 nm and 380.5 nm).

The patent also teaches that naturally occurring "airglow" in the upper atmosphere and in parts of the "ionosphere" normally found about 40-100 kilometers (km) above the Earth's surface but varying around the Earth results from naturally occurring electrons, gamma rays, and X-rays from space which bombard $N_2$ atoms in the ionosphere producing $N_2^+$ ions and photons, and that natural "airglow" occurs from solar winds colliding with the ionosphere. However, at about 20 kilometers altitude, virtually no naturally occurring gamma rays or X-rays are present and that the 391.4 nm wavelength was selected for the operating wavelength due to the fact that at night the UV region of the spectrum has very low background noise below 20 km altitude.

However, there is background light in the UV region of the spectrum at night caused by reflected moonlight or street lamps at night.

The air luminescence induced by ionizing radiation from nuclear material is typically $10^8$ (i.e. 100 million) times weaker than daylight, which necessitates measurements during darkness.

SUMMARY OF THE INVENTION

An object of the present invention is to provide a sensor to obtain images of any air luminescence generated by a radioactive source.

According to one embodiment the invention relates to a sensor for obtaining images of air luminescence generated by a radio-active source comprising:

a plurality of UV sensitive cameras;

a telescope;

an optical system in an optical path of said telescope for simultaneously imaging an area in a plurality of UV bands and directing an image of that area to each of the UV sensitive cameras including, filters in the light paths of the cameras for directing one of pre-selected UV spectral bands to each of the cameras, at least two of the filters directing an image of a pre-selected UV spectral band where $N_2$ $2^{nd}$ positive group emissions occur from any air luminescence to one of two separate other cameras, and at least one UV band located between the pre-selected UV spectral bands to at least another of the cameras to indicate a background level in that spectral region; and a microprocessor for digitally fusing to yield one image of air luminescence.

The invention also relates to a method of obtaining images of air luminescence generated by a radioactive source comprising the steps of:

directing the light from a telescope through an optical system to a plurality of UV sensitive cameras;

filtering the light for directing one of a plurality of pre-selected UV spectral bands to each camera, wherein UV spectral bands $N_2$ $2^{nd}$ positive group emissions occurring from any air luminescence are directed to at least two of said cameras, and at least one other UV spectral band between the $N_2$ $2^{nd}$ positive group emissions spectral bands are directed to at least another of the cameras; and images from all of the cameras are digitally fused to yield one image of air luminescence indicative of radioactivity.

BRIEF DESCRIPTION OF THE DRAWINGS

Preferred embodiments of the invention will now be described in more detail with reference to the accompanying drawings, wherein.

DESCRIPTION OF THE PREFERRED EMBODIMENTS

The darkness provided outside at night, including moonlit conditions is suitable for obtaining images of that luminescence by a sensor, according to the present invention, which obtains images in six wavelength windows with two of those six windows being background windows to provide discrimination against interfering broadband light and black-body emitters such as moonlight and streetlights.

The real-time measurement of the sensor background (noise) is necessary, because it must be subtracted from other measured images in order to obtain a true signal. That noise is time dependent due to a camera's temperature fluctuations caused by temperature changes in the field environment and it can also vary with camera gain and exposure times which can vary between measurements.

Experience with the sensor of the present invention indicates that interleaved background measurements on a one second time scale is far superior to measurements acquired several minutes apart.

Based on measurements performed by the inventors, it has been confirmed that the air luminescence surrounding a radioactive source can indeed be detected with imaging systems, that the radio-luminescence has a unique spectral fingerprint consisting primarily of the $N_2$ $2^{nd}$ positive group emissions and that those emissions constitute about 80% of the radio-luminescence. Furthermore, the $N_2$ $2^{nd}$ positive group emissions are not severely masked by natural or man-made light at night.

The construction of a laboratory sensor according to the present invention consisted of a special Maksutov telescope, special narrow-band filters, beam-splitters and ultra-sensitive cameras. Images from four spectral windows were acquired simultaneously with the apparatus and then combined digitally with image processing techniques to enhance the radio-luminescent signal. The results clearly illustrated that radio-luminescence could be imaged at a distance with a high detection efficiency. Image fusion by powerful processors is desirable to provide a near real-time image of the radio-luminescence so that an operator can make timely decisions on the state of a measurement rather than wait for several minutes only to discover, for example, that interfering light has corrupted the images.

Figure 1:
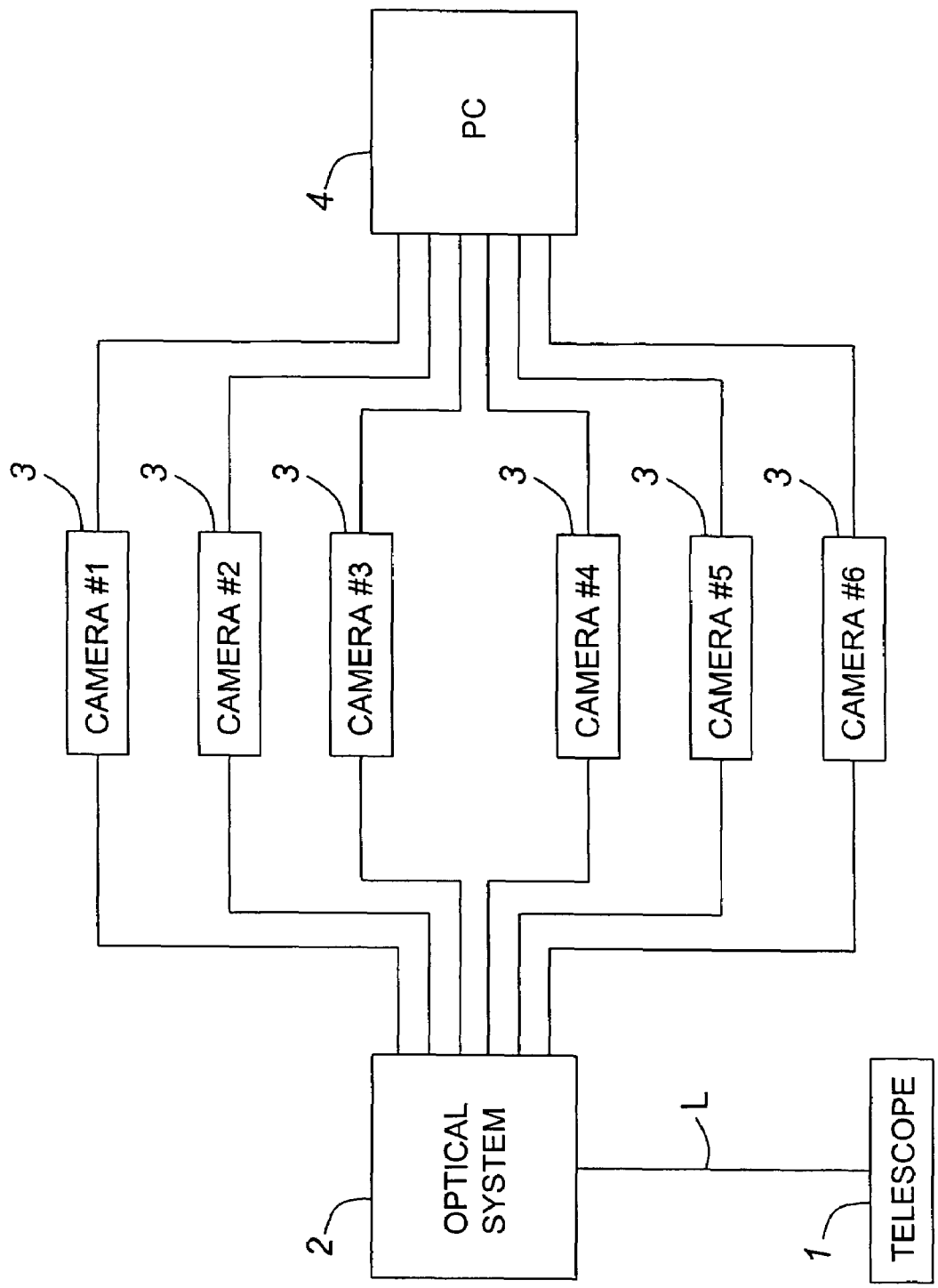
FIG. 1 is a block diagram of an imager in accordance with the present invention.

With reference to FIG. 1, the basic elements of the image include a telescope 1, which is preferably a Maksutov telescope and retro-reflector which directs light L to an optical system 2, a plurality of cameras 3 for receiving light from the optical system 2 and a personal computer 4 connected to all of the cameras.

Figure 2:
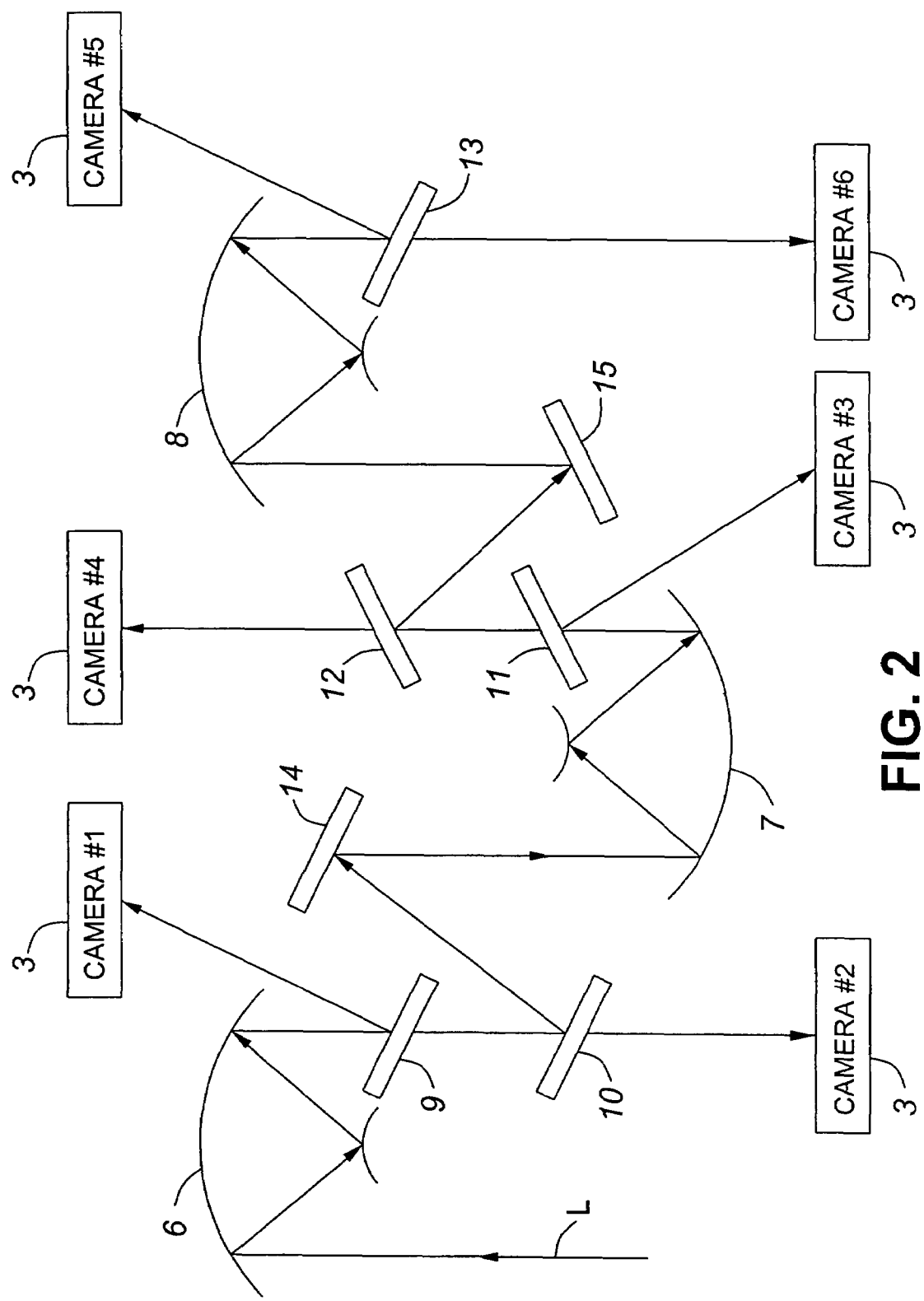
FIG. 2 is a schematic line drawing of an imager according to an embodiment of the present invention.

As shown in FIG. 2, the optical system 2 includes three Offner or other unit-magnification optical relay systems 6, 7 and 8, and five beam splitters 9 to 13. Two additional mirrors 14 and 15 in the optical system "fold" a light beam into a compact opto-mechanical arrangement and focus it onto the image plane of the six UV-sensitive, intensified and cooled CCD cameras 3 (Cameras #1, #2, #3, #4, #5 and #6). A near-IR sensitive intensified and cooled CCD camera (not shown) and the custom mounted PC 4 are used in association with the imager. The PC 4 consists of a motherboard, two 4-channel frame-grabbers one u-processor, an I/O board, an eight channel RS-232 board, a USB interface and seven custom camera interface boards. The footprint of the apparatus is about 1.5 $m^2$ with the imager being about 1.5 m high when mounted on its tripod. The total weight, including the mounted hardware is around 122 kg. It can be transported in three parts, which include (i) a custom heavy-duty tripod (16 kg), (ii) a pan and tilt stage with 3 power supplies (18 kg), and (iii) the imager, including the cameras, computer and electronics (88 kg).

The focal length of the telescope 1 is approximately 1170 mm resulting in an optical speed of F-value of 4.5 with the relay systems each having unit magnification. Focusing is accomplished by adjusting the position of a retro-reflector in the optical path between the Maksutov telescope and the first optical relay 6.

The single near IR sensitive intensified and cooled CCD camera, which is sensitive to visible and near-infrared light is mounted adjacent to the sensor with its own telescopic lens, is used for aiming the imager.

Because of the extremely low detected light levels from air luminescence, it is important that losses in the optical system be kept to a minimum. Consequently, all of the mirrors have highly reflective coatings, the beam-splitters are nearly lossless, vignetting (shadowing created by obstacles in the path of light) is minimized and the cameras have single-photon detection sensitivity. Any stray light entering the telescope, i.e. light entering the telescope from beyond the field-of-view, is trapped before it scatters towards the cameras and interferes with the detection capabilities of the cameras.

The telescope 1 for the prototype sensor is a Makutsov type where a secondary mirror directs reflected light through an aperture in the center of the primary mirror which is a common telescope configuration. The main advantage of the telescope is its short insertion length due to the folded nature of the light path. The telescope 1 was used in order to minimize the footprint and improve portability. It can also be easily scaled to larger objectives.

A prototype utilized a Maksutov design telescope, which combines refractive and reflective elements, i.e. it is catadioptric. One advantage of using such a telescope is that all of the mirror components can be spherical in shape, which are more economically fabricated and more easily aligned. A glass lens at the entrance to the telescope corrects for aberrations in the telescope which occur due to the use of simple spherical mirrors and it also acts as a dust seal. The curvature of the inside of the lens has been constrained to equal that of the secondary mirror which is created by making the central portion of the inside of the lens reflective. Baffles between the secondary and primary mirrors reduce much of the undesirable stray light. A cylindrical light shield is extendable at the front of the telescope. The insertion length of the telescope is about 350 mm with alight shield that can be extended an additional 150 mm.

Stray visible light must be significantly attenuated if weak sources of UV from air luminescence are to be imaged by the cameras since they are sensitive to both UV and visible light. This is accomplished by the use of wavelength-selective reflectors, baffles, specialty glasses and careful optical layout. Optical pupils, such as aperture stops, field stops and Lyot stops have been used to reduce stray light from reaching the image planes of the cameras.

Mirror surfaces in the telescope reflect light between 280 nm and 420 nm.

Anti-reflection coatings were also applied to the Maksutov corrector lens at the entrance to the telescope to reduce light loss at the glass-air boundaries and to reflect a substantial portion of the visible spectrum while transmitting the UV spectrum towards the primary mirror.

Image exposure is controlled by an electronic shutter in each camera 3. The cameras 3 are dual-stage intensified, Peltier cooled CCD imagers. Intensifier dark noise and CCD noise dominate images for exposures longer than 0.5 s. Therefore, background measurements are interleaved with signal measurements in order to permit the accurate correction of the signal for the deleterious effect of background noise. This is achieved by periodically recording the background image while the electronic shutter is closed.

The function of the mirror systems 6 and 7 is to split the incoming light into three spectral windows and re-image the light in each window with unit magnification. As illustrated in FIG. 2, two of the light paths are each directed to cameras 3 while the remaining light is directed to the next mirror relay system. The last relay mirror system 8 splits the incoming light into only two spectral windows with unit magnification. Each is directed to a camera. Six spectral images can be achieved with three relay systems. An Offner relay system consists of a primary and secondary mirror, both of which are spherical and fabricated from blackened (NGI) glass coated to reflect 280 nm to 420 nm light. They are rectangular in profile and are about 200 mm long by 100 mm wide. The rectangular shape is necessary so that light reflected from three of the five beam-splitters will not be obstructed. The secondary mirrors of the relay system are manually adjustable in tilt and the primary mirrors are mounted on short spacers that can be altered in length should a tilt adjustment be necessary at this location.

Figure 3:
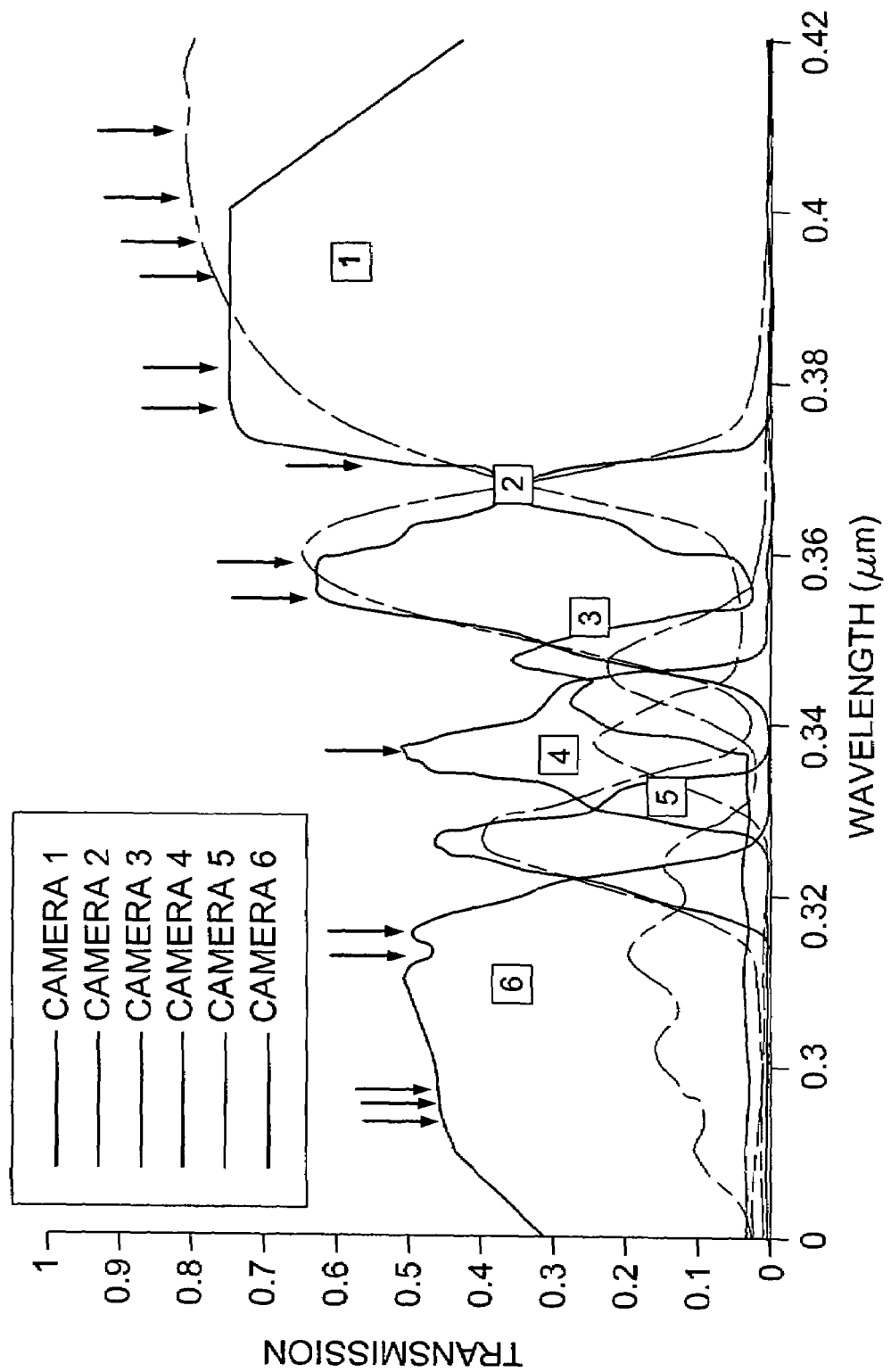
FIG. 3 are graphs of band-pass features of the imager for the cameras shown in FIG. 1.

The beam-splitters 9-13 are fabricated from specially coated fused-silica glass to reflect light in selective color bands (as illustrated in FIG. 3). Losses are about 3% per beam-splitter. The beam-splitters are manually adjustable in tilt to facilitate light-beam alignment onto the cameras.

The reflector and preferred Offner relay systems are fabricated from high-optical density NGI glass with reflective surfaces coated to reflect only 280 nm to 420 nm light. Unreflected light is transmitted by the coating and absorbed by black dye in the glass reducing stray light from scattering further into the sensor.

Simultaneous focusing of all cameras is provided, with one focusing adjustment consisting of a retro-reflector that is located behind the telescope's image plane. The retro-reflector creates a folded path that is extendable to accommodate targets between 30 m and infinity. The reflector is mounted on a precision slide with 2-inches of travel. A stepping motor under computer control drives the slide and no other optical components need to be adjusted to simultaneously focus an image in each camera.

The sensor simultaneously images air luminescence in 6 spectral windows as illustrated by the graphs in FIG. 3 where solid lines represent the design band pass and the dashed lines represent the measured band pass. Four of the spectral windows (graphs 1, 2, 4 and 6) are centered at 390 nm, 356 nm, 337 nm and 316 nm which cover strong transitions of the $N_2$ molecule and the remaining windows are centered at spectral regions 345 nm and 322 nm (graphs 3 and 5) which lie in a spectral region that contains very little transition strength i.e. they are primarily sensitive to interfering broadband light such as blackbody radiation.

In operation, light from the telescope 1 is directed to the first relay 6, which redirects the light beam to a first beam-splitter 9. The beam-splitter 9 reflects light in one wavelength window to Camera #1 and transmits the remaining light to a second beam-splitter 10, which in turn directs the light beam in a second wavelength window to Camera #2 and reflects the remaining light to a first mirror 14. The mirror 14 then reflects the light to a second relay 7, which redirects the light to a third beam-splitter 11. The beam-splitter 11 reflects the light in a third wavelength window to Camera #3 and transmits light to a fourth beam-splitter 12, which directs light in a fourth wavelength window to Camera #4. Remaining light is reflected from beam-splitter 12 to a mirror 15 which reflects the light to a third relay 8. The third relay 8 redirects the light path to a fifth beam-splitter 13, which reflects the light in a fifth wavelength window to camera #5 and transmits the remaining light to Camera #6.

The images from all six cameras are numerically aligned, background-subtracted, filtered, down-sampled and signal-averaged prior to image fusion by a microprocessor, which occurs in near-real time. The image enhancement method employed is a 2-dimensional extension of the spectral unfolding methods often utilized in radiation dosimetry. It reduces six images to one signal image and one (or more) background images. Four of the spectral windows are centered at spectral windows 366-420 nm, preferably 390 nm; 348-366 nm, preferably 356 nm; 331-346 nm, preferably 337 nm; and 280-322 nm, preferably 316 nm that cover strong transitions of the $N_2$ molecule (see FIG. 3), and the remaining windows lie in spectral regions 342-348 nm, preferably 345 nm and 318-327, preferably 322 nm that contain very little emission i.e. they are "background" windows.

Tests were carried out at Defence R&D Canada (DRDC) Ottawa with an α-target (up to four 6 mCi $^{241}$Am source strips approximately 1" wide by 6" long) and β targets (a 0.5Ci $^{90}$Sr target and a 2Ci $^{147}$Pm target) with target distances of 30 m to 135 m. At 30 m the alpha source and beta sources are both visible. The $^{147}$Pm source appeared more intense than the $^{90}$Sr source, because it provides a higher energy density near the source. The $^{241}$Am sources can also be detected at a target distance of 500 m. Moonlight and street lights illuminating a snow-covered test field do not prevent the α and β sources from being detected, provided that interfering light is not scattered directly into the telescope by the snow.

Various modifications may be made to the preferred embodiments without departing form the spirit and scope of the invention as defined in the appended claims.

The embodiment of the invention in which an exclusive property or privilege is claimed are defined as follows:

1. A sensor for obtaining images of air luminescence generated by a radio-active source comprising:
    a plurality of UV sensitive cameras;
    a telescope;
    an optical system in an optical path of said telescope for simultaneously imaging an area in a plurality of UV bands and directing an image of that area to each of the UV sensitive cameras;
    filters in the light paths of the cameras for directing one of pre-selected UV spectral bands to each of the cameras, at least two of the filters directing an image of a pre-selected UV spectral band where $N_2$ $2^{nd}$ positive group emissions occur from any air luminescence to one of two separate other cameras, and at least one UV band located between the pre-selected UV spectral bands to at least another of the cameras to indicate a background level in that spectral region; and
    a microprocessor for digitally fusing to yield one image of air luminescence.

2. The sensor of claim 1, wherein the optical system includes relays, mirrors and beam splitters creating the folded light path.

3. The sensor of claim 2, wherein the beam-splitters are formed of fused-silica glass coated to reflect light in selective bands.

4. The sensor of claim 2 wherein the preselected UV spectral bands lie in the wavelength windows 366-420 nm, 348-366 nm, 331-346 nm and 280-322 nm.

5. The sensor of claim 4, wherein the pre-selected UV spectral bands are centered at 390 nm, 337 nm and 316 nm n.

6. The sensor of claim 5, wherein said at least one other UV band lies in one of the wavelength windows 342-348 nm and 318-327 nm to form an image that is directed to a UV sensitive and cooled CCD camera.

7. The sensor of claim 6, wherein said at least one other UV band is centered at one of 345 nm and 322 nm.

8. The sensor of claim 2, wherein the telescope is catadioptric.

9. The sensor of claim 8, wherein the relays are three unit magnification systems formed from high density NGI glass with reflective surfaces coated to reflect only 280 nm to 420 nm light.

10. The sensor of claim 9 including six cameras, five beam-splitters and two mirrors to fold the light beam and focus selected UV spectral bands onto an image plane of six UV-sensitive cameras.

11. The sensor of claim 10, wherein the beam-splitters are coated fused-silica glass to reflect light in pre-selected spectral bands.

12. The sensor of claim 10 including a slide; and light path from the telescope to the relay mirror system movable on said slide for simultaneous focusing the light path onto an image plane of each camera.

13. The sensor of claim 12, including a stepping motor controlled by said microprocessor for driving the slide.

14. The sensor of claim 9, including a glass lens at an entrance to the telescope for correcting for aberrations in the telescope, said lens having an inside central portion reflective for making a secondary mirror of the telescope.

15. A method of obtaining images of air luminescence generated by a radioactive source comprising the steps of:
   directing the light from a telescope through an optical system to a plurality of UV sensitive cameras;
   filtering the light for directing one of a plurality of pre-selected UV spectral bands to each camera, wherein UV spectral bands $N_2$ $2^{nd}$ positive group emissions occurring from any air luminescence are directed to at least two of said cameras, and at least one other UV spectral band between the $N_2$ $2^{nd}$ positive group emissions spectral bands are directed to at least another of the cameras; and
   images from all of the cameras are digitally fused to yield one image of air luminescence indicative of radioactivity.

16. The method of claim 15, wherein the UV spectral bands where $N_2$ $2^{nd}$ positive group emissions occur lie in the wavelength windows 366-420 nm, 348-366 nm, 331-346 nm and 280-322 nm.

17. The method of claim 16, wherein the UV spectral bands where $N_2$ $2^{nd}$ positive group emissions occur are centered at 390, 356, 337 and 316 nm.

18. The method of claim 17, wherein the at least one other spectral band lies in the wavelength windows 342-348 nm and 318-327 nm.

19. The method of claim 18, wherein the at least one other spectral band is centered at one of 345 and 322 nm.

* * * * *